United States Patent
Zhang et al.

(10) Patent No.: US 12,531,239 B2
(45) Date of Patent: Jan. 20, 2026

(54) POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Jin Zhang, Osaka (JP); Issei Ikeuchi, Osaka (JP); Mitsuhiro Hibino, Kyoto (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 695 days.

(21) Appl. No.: 17/799,761

(22) PCT Filed: Jan. 21, 2021

(86) PCT No.: PCT/JP2021/001968
§ 371 (c)(1),
(2) Date: Aug. 15, 2022

(87) PCT Pub. No.: WO2021/171843
PCT Pub. Date: Sep. 2, 2021

(65) Prior Publication Data
US 2023/0094468 A1    Mar. 30, 2023

(30) Foreign Application Priority Data
Feb. 26, 2020    (JP) .................................. 2020-030065

(51) Int. Cl.
*H01M 4/525*    (2010.01)
*H01M 4/02*    (2006.01)
(Continued)

(52) U.S. Cl.
CPC ........... *H01M 4/525* (2013.01); *H01M 4/485* (2013.01); *H01M 4/505* (2013.01);
(Continued)

(58) Field of Classification Search
CPC ...... H01M 4/525; H01M 4/485; H01M 4/505; H01M 10/0525; H01M 50/46;
(Continued)

(56) References Cited

U.S. PATENT DOCUMENTS

2013/0146807 A1    6/2013    Katsu et al.
2013/0168599 A1    7/2013    Kato et al.
(Continued)

FOREIGN PATENT DOCUMENTS

CN    103069623 A    4/2013
JP    6197029 B2    9/2017
(Continued)

OTHER PUBLICATIONS

Konishi, H., Hirano, T., Takamatsu, D., Gunji, A., Feng, X., Furutsuki, S., Okumura, T., & Terada, S. Improvement of electrochemical performance of nickel-manganese-based lithium-rich layer-structured cathode material by controlling lithium/transition-metal ratio. Solid State Ionics, 327, 39-46 (2018) (Year: 2018).*
(Continued)

*Primary Examiner* — Nicholas A Smith
*Assistant Examiner* — Seamus Patrick McNulty
(74) *Attorney, Agent, or Firm* — WHDA, LLP

(57) ABSTRACT

This positive electrode active material for a non-aqueous electrolyte secondary battery contains a lithium-transition metal composite oxide that has a rock salt-related structure and is represented by the compositional formula $Li_aMn_bM_cO_{2-x}F_x$ (in the formula: M is at least one metal element excluding Li and Mn; $2.000 < a+b+c \leq 2.195$; $1.0 < a \leq 1.4$; $0.4 \leq b \leq 0.9$; $0 \leq c \leq 0.2$; and $0.2 \leq x \leq 0.6$). The metal
(Continued)

element M preferably is at least one selected from Ni, Sn, Mo, Ti, W, Zn, and Al.

3 Claims, 1 Drawing Sheet

(51) Int. Cl.
 *H01M 4/485* (2010.01)
 *H01M 4/505* (2010.01)
 *H01M 10/0525* (2010.01)
 *H01M 50/46* (2021.01)

(52) U.S. Cl.
 CPC ....... *H01M 10/0525* (2013.01); *H01M 50/46* (2021.01); *H01M 2004/021* (2013.01); *H01M 2004/028* (2013.01)

(58) Field of Classification Search
 CPC ..... H01M 2004/021; H01M 2004/028; H01M 4/131; H01M 10/052
 See application file for complete search history.

(56) References Cited

U.S. PATENT DOCUMENTS

| | | | |
|---|---|---|---|
| 2015/0380737 A1 | 12/2015 | Kawasato et al. | |
| 2016/0049640 A1 | 2/2016 | Takeuchi et al. | |
| 2018/0205073 A1* | 7/2018 | Natsui ................. | H01M 4/628 |
| 2019/0088945 A1 | 3/2019 | Ceder et al. | |
| 2019/0181443 A1 | 6/2019 | Ikeuchi et al. | |
| 2019/0221837 A1 | 7/2019 | Ishikawa et al. | |
| 2019/0221838 A1 | 7/2019 | Ishikawa et al. | |
| 2020/0020943 A1 | 1/2020 | Natsui et al. | |

FOREIGN PATENT DOCUMENTS

| | | |
|---|---|---|
| JP | 2019-125574 A | 7/2019 |
| JP | 2019-125575 A | 7/2019 |
| JP | 2019-220376 A | 12/2019 |

OTHER PUBLICATIONS

Clément, R. J., Lun, Z., & Ceder, G. (2020). Cation-disordered rocksalt transition metal oxides and oxyfluorides for high energy lithium-ion cathodes. Energy Environmental Science, 13(2), 345-373. (Year: 2020).*

Richards, W. D., Dacek, S. T., Kitchaev, D. A., & Ceder, G. (2017). Fluorination of lithium-excess transition metal oxide cathode materials. Advanced Energy Materials, 8(5). (Year: 2017).*

Office Action dated Nov. 25, 2022, issued in counterpart IN Application 202247046687, with English Translation. (6 pages).

Extended (Supplementary)European Search Report dated Jul. 28, 2023, issued in counterpart EP Application No. 21761186.2. (5 pages).

International Search Report dated Apr. 13, 2021, issued in counterpart Application No. PCT/JP2021/001968, with English translation (5 pages).

Written Opinion dated Apr. 13, 2021, issued in couterpart Application No. PCT/JP2021/001968 (3 pages).

Office Action dated Feb. 22, 2025, issued in counterpart CN Application No. 202180014934.9, with English translation. (14 pages).

* cited by examiner

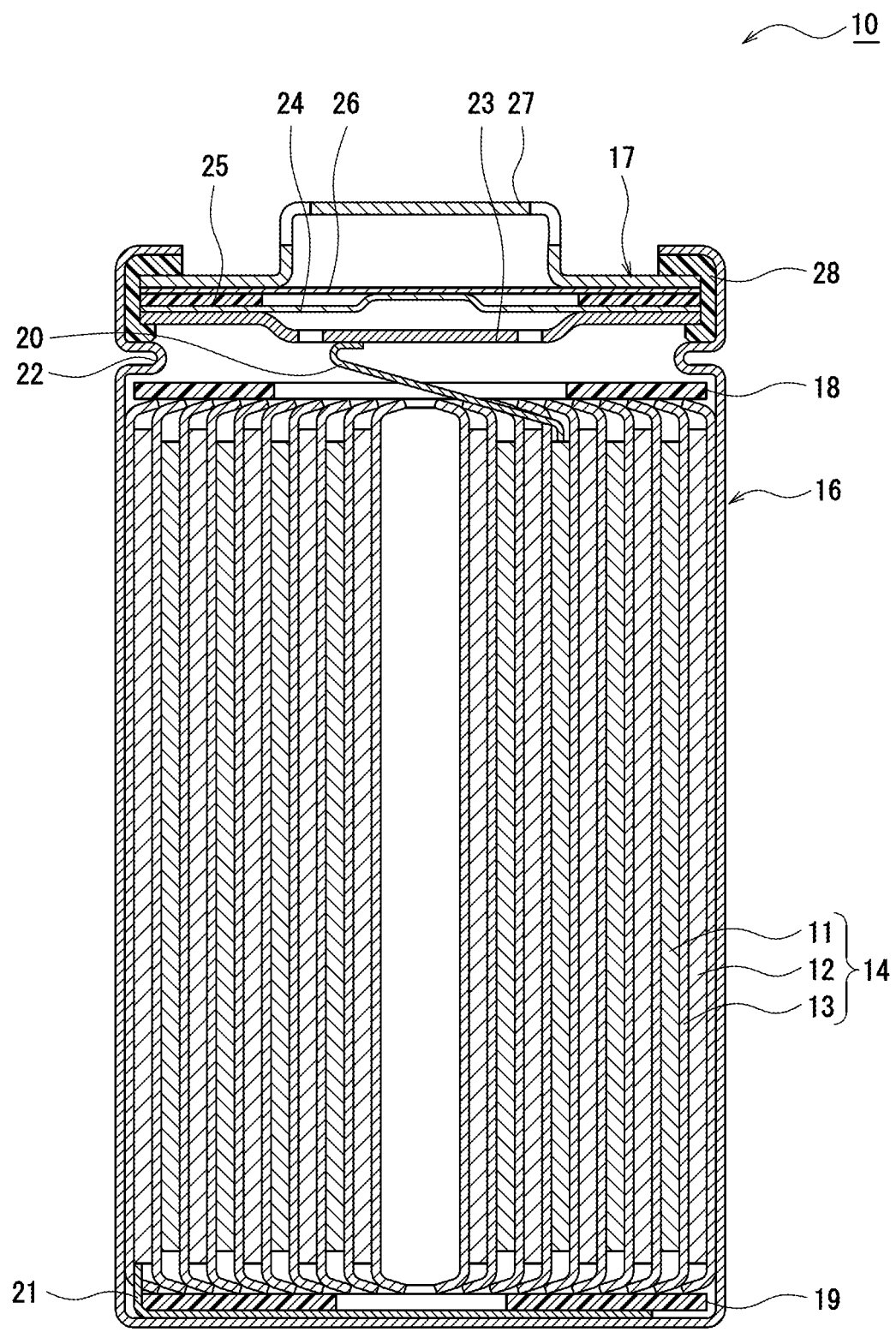

POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/001968 filed on Jan. 21, 2021 which claims the benefit of priorities under 35 U.S.C. § 119 (a) of Japanese Patent Application No. 2020-030065 filed in Japan on Feb. 26, 2020, the contents of which are incorporated herein by reference.

TECHNICAL FIELD

The present disclosure generally relates to a positive electrode active material for a non-aqueous electrolyte secondary battery and a non-aqueous electrolyte secondary battery using the positive electrode active material.

BACKGROUND ART

In a non-aqueous electrolyte secondary battery such as a lithium-ion battery, a positive electrode active material significantly affects battery performance such as input-output characteristics, a capacity, and cycle characteristics. Although an NCM-based lithium-transition metal composite oxide containing Ni, Co, and Mn is commonly used for the positive electrode active material, for example, a Li-excess material based on $Li_xMn_{1-x}O_2$ having a rock-salt structure has attracted attention in recent years as a next-generation positive electrode active material with high capacity.

For example, Patent Literature 1 discloses a positive electrode active material including a lithium-transition metal composite oxide having a crystal structure belonging to a space group Fm-3m and represented by the compositional formula $Li_{1+x}Nb_yMe_zA_pO_2$, wherein Me is a transition metal including Fe and/or Mn, $0<x<1$, $0<y<0.5$, $0.25 \leq z<1$, A is an element other than Nb and Me, and $0 \leq p \leq 0.2$, provided that an oxide of $Li_{1+p}Fe_{1-q}Nb_qO_2$ wherein $0.15<p \leq 0.3$ and $0<q \leq 0.3$ is excluded.

CITATION LIST

Patent Literature

PATENT LITERATURE 1: Japanese Patent No. 6197029

SUMMARY

As described above, the material based on $Li_xMn_{1-x}O_2$ having a rock-salt structure is expected as a positive electrode active material with high capacity; however, various characteristics are required to be improved for practical use, and a load characteristic is particularly required to be increased. The same applies to the positive electrode active material disclosed in Patent Literature 1, and the load characteristic is required to be increased.

A positive electrode active material for a non-aqueous electrolyte secondary battery of an aspect of the present disclosure includes a lithium-transition metal composite oxide having a rock-salt related structure and represented by the compositional formula $Li_aMn_bM_cO_{2-x}F_x$, wherein M is at least one metal element excluding Li and Mn, $2.000<a+b+c \leq 2.195$, $1.0<a \leq 1.4$, $0.4 \leq b \leq 0.9$, $0 \leq c \leq 0.2$, and $0.2 \leq x \leq 0.6$.

A non-aqueous electrolyte secondary battery of an aspect of the present disclosure comprises: a positive electrode including the positive electrode active material; a negative electrode; a separator interposed between the positive electrode and the negative electrode; and a non-aqueous electrolyte.

According to the present disclosure, a positive electrode active material with high capacity and high load characteristic can be provided. According to the positive electrode active material according to the present disclosure, a capacity and load characteristic of a non-aqueous electrolyte secondary battery can be increased.

BRIEF DESCRIPTION OF DRAWING

FIG. 1 is a sectional view of a non-aqueous electrolyte secondary battery of an example of an embodiment.

DESCRIPTION OF EMBODIMENTS

As described above, the material based on $Li_xMn_{1-x}O_2$ having a rock-salt structure is expected as a positive electrode active material with high capacity; however, a problem is that a non-aqueous electrolyte secondary battery using the material has a low load characteristic. The present inventors have made intensive investigation to improve the load characteristic of the material, and as a result, have found that introducing a predetermined amount of fluoride ions, and introducing Li into a tetrahedral site of the crystal structure to form a cation-rich structure specifically increase the load characteristic. Although a mechanism of the increase in the load characteristic is unclear, the art of the present disclosure can be a breakthrough for practical use of the next-generation positive electrode active material with high capacity and high load characteristic.

Hereinafter, an example of embodiments of the positive electrode active material for a non-aqueous electrolyte secondary battery according to the present disclosure and a non-aqueous electrolyte secondary battery using the positive electrode active material will be described in detail with reference to the drawings. It is anticipated in advance to selectively combine a plurality of embodiments and modified examples described below.

Hereinafter, a cylindrical battery in which a wound electrode assembly 14 is housed in a bottomed cylindrical outer housing can 16 will be exemplified, but an outer housing body is not limited to a cylindrical outer housing can and may be, for example, a rectangular outer housing can (rectangular battery), a coin-shaped outer housing can (coin battery), or an outer housing body constituted with laminated sheets including a metal layer and a resin layer (laminate battery). The electrode assembly may be a stacked electrode assembly in which a plurality of positive electrodes and a plurality of negative electrodes are alternatively stacked with separators interposed therebetween.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the outer housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The outer housing can 16 is a bottomed cylindrical metallic container having an opening at one side in an axial direction, and the opening of the outer housing can 16 is sealed with a sealing assembly 17. Hereinafter, for convenience of description, the sealing assembly 17 side of the battery will be described as the upper side, and the bottom side of the outer housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the outer housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the outer housing can 16 by welding or the like, and the outer housing can 16 becomes a negative electrode terminal.

A gasket 28 is provided between the outer housing can 16 and the sealing assembly 17 to achieve sealability inside the battery. On the outer housing can 16, a grooved part 22 in which a part of a side part thereof projects inside for supporting the sealing assembly 17 is formed. The grooved part 22 is preferably formed in a circular shape along a circumferential direction of the outer housing can 16, and supports the sealing assembly 17 with the upper surface thereof. The sealing assembly 17 is fixed on the upper part of the outer housing can 16 with the grooved part 22 and with an end part of the opening of the outer housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, and particularly a positive electrode active material constituting the positive electrode 11 will be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum and an aluminum alloy, a film in which such a metal is disposed on a surface layer thereof, and the like may be used. The positive electrode mixture layer includes a positive electrode active material, a conductive agent, and a binder, and is preferably provided on both surfaces of the positive electrode core. The positive electrode 11 may be produced by, for example, applying a positive electrode mixture slurry including the positive electrode active material, the conductive agent, the binder, and the like on the positive electrode core, drying and subsequently compressing the applied film to form the positive electrode mixture layers on both the surfaces of the positive electrode core.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide resin, an acrylic resin, and a polyolefin resin. With these resins, a cellulose derivative such as carboxymethyl cellulose (CMC) or a salt thereof, polyethylene oxide (PEO), and the like may be used in combination.

The positive electrode active material includes a lithium-transition metal composite oxide having a rock-salt related structure and represented by the compositional formula $Li_aMn_bM_cO_{2-x}F_x$, wherein M is at least one metal element excluding Li and Mn, $2.000 < a+b+c \leq 2.195$, $1.0 < a \leq 1.4$, $0.4 \leq b \leq 0.9$, $0 \leq c \leq 0.2$, and $0.2 \leq x \leq 0.6$. The composite oxide is a Li-excess material having a molar ratio of Li of more than 1, and is also a cation-excess (cation-rich) composite oxide having a molar ratio of metal elements including at least Li and Mn of more than 2. A predetermined amount of fluoride ions are introduced to replace some O with F.

The positive electrode active material includes the composite oxide represented by the above compositional formula as a main component. Here, the main component means a component with the highest mass ratio among constituting components of the composite oxide. Although a composite oxide other than the composite oxide represented by the above compositional formula (for example, a composite oxide being not Li-excess and a composite compound containing no fluoride ion) may be used in combination for the positive electrode active material in the positive electrode 11, a content of the above composite oxide is preferably 50 mass % or more, and may be substantially 100 mass %. A composition of the composite oxide may be measured by using an ICP emission spectroscopy analyzer (iCAP6300, manufactured by Thermo Fisher Scientific K.K.).

The composite oxide represented by the above compositional formula has a rock-salt related structure, similar to a rock-salt structure, in which Li ions are introduced into an octahedral site in the rock-salt structure and also into a tetrahedral site present around the octahedral site. The crystal structure of the composite oxide represented by the above compositional formula is similar to the rock-salt crystal structure, but does not belong to the space group Fm-3m. The rock-salt related structure in which Li ions are introduced into the tetrahedral site of the composite oxide is identified from an X-ray diffraction pattern measured by using a powder X-ray diffraction apparatus (desktop X-ray diffraction apparatus, MiniFlex, manufactured by Rigaku Corporation, X-ray source: CuKα).

The lithium-transition metal composite oxide of an aspect of an embodiment contains substantially only Li and Mn as the metal element. The lithium-transition metal composite oxide of another aspect of an embodiment contains another metal element M in addition to Li and Mn. Examples of the other metal element M include at least one selected from the group consisting of Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er. Among them, at least one selected from the group consisting of Ni, Sn, Mo, Ti, W, Zn, and Al is preferable.

In the composite oxide represented by the above compositional formula, a molar ratio of Li, Mn, and an optionally added metal element M, which are cationic components, (a+b+c), satisfies $2.000<a+b+c\leq2.195$, and preferably $2.000<a+b+c\leq2.150$. Using the cation-rich F-containing composite oxide having the molar ratio of cationic components (a+b+c) within the above range specifically increases a high-rate characteristic and yields a battery with high load characteristic.

In the composite oxide represented by the above compositional formula, a molar ratio of Li and Mn, (a+b), preferably satisfies $1.900<x\leq2.195$, and more preferably $1.950\leq x\leq2.150$. A molar ratio of Li (a) satisfies $1.0<a\leq1.4$, preferably $1.10\leq a\leq1.35$, and more preferably $1.15\leq a\leq1.35$. A molar ratio of Mn (b) satisfies $0.4\leq b\leq0.9$, preferably $0.65\leq b\leq0.89$, and more preferably $0.70\leq b\leq0.88$. When the molar ratio of Li and Mn is within the above range, the effect of improvement in the load characteristic is more remarkable.

In the composite oxide represented by the above compositional formula, a molar ratio of F (x) satisfies $0.2\leq x\leq0.6$, preferably $0.2\leq x\leq0.5$, and more preferably $0.20\leq x\leq0.35$. In this case, the effect of improvement in the load characteristic more remarkably appears. A molar ratio of the another metal element M other than Li and Mn, (c), is 0.2 or less, preferably 0.15 or less, and more preferably 0.12 or less.

The lithium-transition metal composite oxide may be synthesized by, for example, using lithium fluoride (LiF), lithium manganate ($LiMnO_2$), and lithium oxide ($Li_2O$) as raw materials, and performing a mixing treatment with a planetary ball mill in an inert gas atmosphere such as Ar. A mixer that may apply a similar stirring shear force to the powder may be used instead of the planetary ball mill, and the powder may be heated during the mixing treatment. The composition of the composite oxide may be regulated within a target range by changing, for example, a mixing ratio of raw materials and mixing conditions (such as the number of rotation, a time of the treatment, and a temperature of the treatment).

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on both surfaces of the negative electrode core. The negative electrode 12 may be produced by, for example, applying a negative electrode mixture slurry including the negative electrode active material, the conductive agent, the binder, and the like on the surface of the negative electrode core, drying and subsequently compressing the applied film to form the negative electrode mixture layers on both the surfaces of the negative electrode core.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the conductive agent included in the negative electrode mixture layer, a carbon material such as carbon black, acetylene black, Ketjenblack, and graphite may be used similar to that in the positive electrode 11. For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric.

For a material of the separator 13, a polyolefin such as polyethylene, polypropylene, and a copolymer of ethylene and an α-olefin, cellulose, and the like are preferable. The separator 13 may have any of a single-layered structure and a multilayered structure. On a surface of the separator 13, a heat-resistant layer including inorganic particles, a heat-resistant layer constituted with a highly heat-resistant resin such as an aramid resin, a polyimide, and a polyamideimide, and the like may be formed.

EXAMPLES

Hereinafter, the present disclosure will be further described with Examples, but the present disclosure is not limited to these Examples.

Example 1

[Synthesis of Positive Electrode Active Material]

Lithium fluoride (LiF), lithium manganate (LiMnO$_2$), and lithium oxide (Li$_2$O) were mixed at a predetermined mass ratio. The mixed powder was fed into a planetary ball mill (Premium-Line P7, manufactured by Fritsch GmbH, the number of rotation: 600 rpm, chamber: 45 mL, ball: Zr ball with ϕ3 mm), and treated in an Ar atmosphere at a room temperature for 35 hours (35 cycles of operation for 1 hour and subsequently rest for 10 minutes) to obtain a lithium-transition metal composite oxide represented by the compositional formula Li$_{1.318}$Mn$_{0.825}$O$_{1.792}$F$_{0.208}$. From an X-ray diffraction pattern of the obtained composite oxide, the composite oxide was confirmed to have a crystal structure similar to a rock-salt structure in which Li ions were introduced into a tetrahedral site of the rock-salt structure.

[Production of Positive Electrode]

The obtained positive electrode active material, acetylene black, and polyvinylidene fluoride were mixed at a solid-content mass ratio of 7:2:1, and N-methyl-2-pyrrolidone (NMP) was used as a dispersion medium to prepare a positive electrode mixture slurry. Then, the positive electrode mixture slurry was applied on a positive electrode core made of aluminum foil, the applied film was dried and compressed, and then cut to a predetermined electrode size to obtain a positive electrode.

[Preparation of Non-Aqueous Electrolyte Liquid]

Ethylene carbonate (EC), ethyl methyl carbonate (EMC), and dimethyl carbonate (DMC) were mixed at a predetermined volume ratio. Into the mixed solvent, LiPF$_6$ was added to obtain a non-aqueous electrolyte liquid.

[Production of Test Cell]

The above positive electrode and a negative electrode made of lithium metal foil were oppositely disposed with a separator interposed therebetween to constitute an electrode assembly, and the electrode assembly was housed in a coin-shaped outer housing can. The non-aqueous electrolyte liquid was injected into the outer housing can, and then the outer housing can was sealed to obtain a coin-shaped test cell (non-aqueous electrolyte secondary battery).

On the test cell, a load characteristic was evaluated with the following method. The evaluation result is shown in Table 1 together with the composition of the positive electrode active material.

[Evaluation of Load Characteristic]

Charge-Discharge Conditions at 1st Cycle: Under a normal temperature environment, the test cell was CC-charged at a constant current of 0.05 C until a battery voltage of 5.2 V, then rested for 20 minutes, and CC-discharged at a constant current of 0.05 C until a battery voltage of 2.5 V.

Charge-Discharge Conditions at 2nd Cycle: Under a normal temperature environment, the test cell was CC-charged at a constant current of 0.2 C until a battery voltage of 5.2 V, then rested for 20 minutes, and CC-discharged at a constant current of 0.2 C until a battery voltage of 2.5 V.

Discharge capacities at the 1st cycle and 2nd cycle were measured to determine the load characteristic with the following formula.

Load Characteristic (%)=(Discharge Capacity at 2nd Cycle/Discharge Capacity at 1st Cycle)×100

Examples 2 to 10 and Comparative Examples 1 to 4

Test cells were produced to evaluate the load characteristic in the same manner as in Example 1 except that the mixing ratio of LiF, LiMnO$_2$, and Li$_2$O (in Examples 5, 6, and 17, nickel oxide was further added) was changed in the synthesis of the lithium-transition metal composite oxide so as to obtain the composition shown in Table 1.

TABLE 1

| | Positive electrode active material | | Test cell Load |
|---|---|---|---|
| | Composition Li$_a$Mn$_b$M$_c$O$_{2-x}$F$_x$ | a + b + c (mol) | characteristic (%) |
| Comparative Example 1 | Li$_{1.111}$Mn$_{0.889}$O$_{1.778}$F$_{0.222}$ | 2.000 | 72.2 |
| Example 1 | Li$_{1.318}$Mn$_{0.825}$O$_{1.792}$F$_{0.208}$ | 2.143 | 80.6 |
| Example 2 | Li$_{1.249}$Mn$_{0.846}$O$_{1.787}$F$_{0.213}$ | 2.095 | 84.0 |
| Example 3 | Li$_{1.218}$Mn$_{0.856}$O$_{1.785}$F$_{0.215}$ | 2.074 | 74.8 |
| Example 4 | Li$_{1.184}$Mn$_{0.865}$O$_{1.780}$F$_{0.220}$ | 2.050 | 85.3 |
| Example 5 | Li$_{1.214}$Mn$_{0.780}$Ni$_{0.112}$O$_{1.777}$F$_{0.223}$ | 2.106 | 84.7 |
| Example 6 | Li$_{1.245}$Mn$_{0.768}$Ni$_{0.113}$O$_{1.775}$F$_{0.225}$ | 2.126 | 80.5 |
| Comparative Example 2 | Li$_{1.434}$Mn$_{0.765}$O$_{1.729}$F$_{0.271}$ | 2.199 | 69.0 |
| Comparative Example 3 | Li$_{1.150}$Mn$_{0.850}$O$_{1.700}$F$_{0.300}$ | 2.000 | 68.2 |
| Example 7 | Li$_{1.354}$Mn$_{0.788}$O$_{1.718}$F$_{0.282}$ | 2.142 | 78.6 |
| Example 8 | Li$_{1.286}$Mn$_{0.809}$O$_{1.713}$F$_{0.287}$ | 2.095 | 78.4 |
| Example 9 | Li$_{1.222}$Mn$_{0.828}$O$_{1.707}$F$_{0.293}$ | 2.050 | 82.6 |
| Example 10 | Li$_{1.186}$Mn$_{0.840}$O$_{1.705}$F$_{0.295}$ | 2.026 | 86.3 |
| Example 11 | Li$_{1.167}$Mn$_{0.844}$O$_{1.699}$F$_{0.301}$ | 2.011 | 85.0 |
| Example 12 | Li$_{1.161}$Mn$_{0.846}$O$_{1.699}$F$_{0.301}$ | 2.007 | 82.2 |
| Comparative Example 4 | Li$_{1.250}$Mn$_{0.750}$O$_{1.500}$F$_{0.500}$ | 2.000 | 70.1 |
| Example 13 | Li$_{1.290}$Mn$_{0.737}$O$_{1.500}$F$_{0.500}$ | 2.027 | 76.1 |
| Example 14 | Li$_{1.271}$Mn$_{0.744}$O$_{1.503}$F$_{0.497}$ | 2.015 | 80.0 |
| Example 15 | Li$_{1.262}$Mn$_{0.747}$O$_{1.503}$F$_{0.497}$ | 2.009 | 78.8 |
| Example 16 | Li$_{1.254}$Mn$_{0.749}$O$_{1.499}$F$_{0.501}$ | 2.002 | 74.9 |
| Example 17 | Li$_{1.318}$Mn$_{0.724}$Ni$_{0.007}$O$_{1.511}$F$_{0.489}$ | 2.049 | 88.5 |

As shown in Table 1, any of the test cells in Examples has an excellent load characteristic compared with the test cells in Comparative Examples. In Comparative Example 1 and Examples 1 to 6, in which the molar ratio of F is 0.20 to 0.25, in particular, although the positive electrode active material in Comparative Example 1 and the positive electrode active material in Example 4 have similar compositions, the test cells using them have a large difference in the load characteristic. Although the positive electrode active materials in Comparative Example 3 and Example 12 and the positive electrode active materials in Comparative Example 4 and Example 16 also have extremely similar compositions, the test cells have similarly a large difference in the load characteristic. The test cell in Comparative Example 2, which uses the positive electrode active material having a total amount of the cationic components of 2.199 mol, has a significantly lower load characteristic than the test cell in Examples.

As above, using a cation-rich F-containing composite oxide having the total amount of the cationic components (a+b+c) within a range of 2.000<a+b+c≤2.195 specifically increases the load characteristic of the battery.

REFERENCE SIGNS LIST

10 Non-aqueous electrolyte secondary battery
11 Positive electrode
12 Negative electrode
13 Separator
14 Electrode assembly
16 Outer housing can
17 Sealing assembly
18, 19 Insulating plate
20 Positive electrode lead 21 Negative electrode lead
22 Grooved part
23 Internal terminal plate
24 Lower vent member
25 Insulating member
26 Upper vent member
27 Cap
28 Gasket

The invention claimed is:

1. A positive electrode active material for a non-aqueous electrolyte secondary battery, including a lithium-transition metal composite oxide having a rock-salt related structure not belonging to the space group Fm-3m and represented by the compositional formula $Li_aMn_bM_cO_{2-x}F_x$, wherein M is at least one metal element excluding Li and Mn, $2.000 < a+b+c \leq 2.195$, $1.0 < a \leq 1.4$, $0.4 \leq b \leq 0.9$, $0 \leq c \leq 0.2$, and $0.2 \leq x \leq 0.6$.

2. The positive electrode active material for a non-aqueous electrolyte secondary battery according to claim 1, wherein the metal element M in the compositional formula $Li_aMn_bM_cO_{2-x}F_x$ is at least one selected from the group consisting of Ni, Sn, Mo, Ti, W, Zn, and Al.

3. A non-aqueous electrolyte secondary battery, comprising:
  a positive electrode including the positive electrode active material according to claim 1;
  a negative electrode;
  a separator interposed between the positive electrode and the negative electrode; and
  a non-aqueous electrolyte.

* * * * *